J. SERRA (Y CARBÓ).
METHOD FOR PURIFYING CORK.
APPLICATION FILED APR. 17, 1906. RENEWED SEPT. 29, 1908.

903,013.

Patented Nov. 3, 1908.

UNITED STATES PATENT OFFICE.

JOSÉ SERRA (Y CARBÓ), OF BARCELONA, SPAIN, ASSIGNOR TO HARVEY COALE, OF BALTIMORE, MARYLAND.

METHOD FOR PURIFYING CORK

No. 903,013.　　　Specification of Letters Patent.　　　Patented Nov. 3, 1908.

Application filed April 17, 1906, Serial No. 312,261. Renewed September 29, 1908. Serial No. 455,304.

*To all whom it may concern:*

Be it known that I, JOSÉ SERRA (Y CARBÓ), a subject of the King of Spain, residing in Barcelona, Spain, have invented certain new and useful Improvements in Methods of Purifying Cork, of which the following is a specification.

In Letters Patent of the United States, #846251, dated Mar. 5, 1907, I have described a method of making an artificial cork having as its base cork granules. It is necessary to thoroughly purify and cleanse these cork granules, and the object of the present invention is to secure this thorough cleansing and purifying.

To this end the invention consists in the special process hereinafter described and more particularly pointed out in the appended claims.

I have shown in the accompanying drawing as illustrative of one way of carrying the invention into effect, a device which may be used when the method is to be carried out on a small scale.

Figure 1:
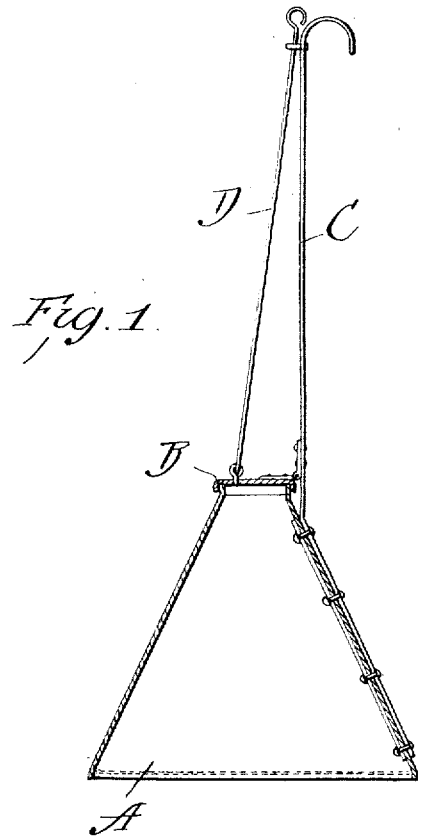
Figure 2:
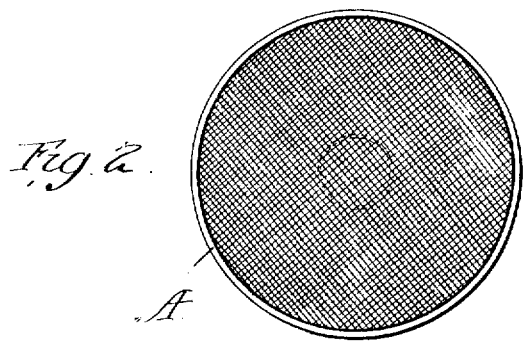

In this drawing,—Figure 1 is a central vertical section of the device. Fig. 2 is a bottom view.

I have found that in order to completely purify and cleanse the cork granules, it is necessary that the granule shall be treated so as to have the impurities carried thereby loosened and each granule separately washed free from the dust and adherent foreign matter, but owing to the extreme lightness of the cork this has been found to be an extremely difficult matter.

I have found that the desired result may be accomplished by first inclosing a mass of the granules of cork so as to hold it in confinement, and then while inclosed and confined submerging the mass in an aqueous bath and permitting the bath to have access to the granules during such submergence and then freeing the granules and allowing them to rise in a separated condition to the surface of the bath, whereby the granules are independently cleansed and purified, and thus each granule passes upward through the purifying liquid and is independently cleansed and purified, the impurities, being invariably heavier than the cork, settling to the bottom of the body of liquid.

In order that the loosening of the impurities adhering to the cork may be more quickly and thoroughly effected I prefer to use an aqueous bath containing a solvent adapted to assist in setting free the cohering impurities from the granules and mention as a chemical adapted for this purpose, sulfuric acid, but I do not limit myself to the special chemical used, and if desired the granules may be subject to the action of more than one kind of liquid.

The device shown in the drawings is suitable for carrying out the process on a small scale comprising a receptacle A of inverted funnel shape having a bottom of wire mesh or gauze, suitably hinged so as to allow it to be opened for the filling of the receptacle with the material to be treated. The receptacle has a handle C by which it may be submerged in the aqueous bath, and its upper smaller end is provided with a cover B which is hinged and which has a rod D extending up in proximity to the handle for manipulating the cover B to open and close the same. After the mass of the granules has been inclosed and confined within the receptacle, the said receptacle is submerged for a sufficient length of time, the liquid of the bath passing through the perforate bottom and coming in contact of course with all of the cork particles. After the receptacle has been submerged for a sufficient length of time for the bath to loosen the cohering impurities of the granules I open the cover B and allow the granules to pass through the opening in the top of the receptacle, and as this opening is contracted as shown in the drawings, the granules are discharged gradually or in a separated condition from the receptacle and pass upwardly and are independently cleansed and purified, the freed impurities settling to the bottom of the bath.

Having thus described my invention, what I claim is:—

1. The process of purifying cork consisting in submerging a confined mass of the granules of cork in an aqueous bath containing a solvent adapted to set free cohering impurities from the granules, then freeing the granules from confinement and permitting them to rise to the surface of the bath.

2. The process of purifying cork consisting in first inclosing a mass of the granules of cork, then while held inclosed and confined submerging the mass in an aqueous bath and permitting the bath to have access to the granules during such submergence and then freeing them and allowing them to rise in a separated condition to the surface of the bath whereby the granules are independently cleansed and purified.

In witness whereof I have hereunto signed my name in the presence of two subscribing witnesses.

JOSÉ SERRA (Y CARBÓ).

Witnesses:
F. L. MIDDLETON,
MADDIN SUMMERS.